United States Patent
Sun et al.

(10) Patent No.: US 11,594,247 B1
(45) Date of Patent: Feb. 28, 2023

(54) SLIDER AIR BEARING DESIGNS WITH HIGHER PRESSURE AND HIGHER THERMAL FLYING HEIGHT (TFC) EFFICIENCY

(71) Applicant: Western Digital Technologies, Inc., San Jose, CA (US)

(72) Inventors: Biao Sun, Fremont, CA (US); Weidong Huang, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/652,811

(22) Filed: Feb. 28, 2022

(51) Int. Cl.
*G11B 5/60* (2006.01)
*G11B 5/48* (2006.01)

(52) U.S. Cl.
CPC .......... *G11B 5/4826* (2013.01); *G11B 5/6011* (2013.01); *G11B 5/6082* (2013.01)

(58) Field of Classification Search
CPC .............................. G11B 5/6011; G11B 5/6082
See application file for complete search history.

(56) References Cited

U.S. PATENT DOCUMENTS

| | | | | |
|---|---|---|---|---|
| 4,802,042 A * | 1/1989 | Strom | ................... | G11B 5/6005 |
| 4,823,216 A * | 4/1989 | Atesmen | ............... | G11B 5/6005 |
| 5,844,749 A * | 12/1998 | Sakai | ....................... | G11B 5/09 |
| 5,978,176 A * | 11/1999 | Ezaki | ....................... | G11B 5/10 |
| 6,198,600 B1 * | 3/2001 | Kitao | ................... | G11B 5/6005 |
| 6,333,835 B1 * | 12/2001 | Kang | ................... | G11B 5/6005 |
| 6,424,494 B1 * | 7/2002 | Koishi | ................. | G11B 5/6082 |
| | | | | 360/236.4 |
| 6,678,119 B1 * | 1/2004 | Pendray | ............... | G11B 5/6005 |
| | | | | 360/235.8 |
| 6,999,282 B2 * | 2/2006 | Rao | ....................... | G11B 5/6005 |
| | | | | 360/235.8 |
| 7,193,805 B1 * | 3/2007 | Haddock | .............. | G11B 5/6005 |
| | | | | 29/603.03 |
| 7,289,299 B1 | 10/2007 | Sun et al. | | |
| 7,477,486 B1 * | 1/2009 | Sun | ....................... | G11B 5/6082 |
| | | | | 360/236.5 |

(Continued)

OTHER PUBLICATIONS

Joerg Fritzsche et al., "The effect of air bearing contour design on thermal pole-tip protrusion," Microsyst Technol (Jun. 2011) 17:813-820.

(Continued)

*Primary Examiner* — Brian E Miller

(57) ABSTRACT

Disclosed herein are sliders with at least one notch-cut in the trailing pad, methods of making them, and data storage devices comprising them. In some embodiments, a slider comprises a leading-edge surface, a trailing-edge surface, and an air-bearing surface (ABS) that includes a trailing pad situated closer to the trailing-edge surface than to the leading-edge surface, wherein the trailing pad comprises at least one notch-cut (e.g., two notch-cuts) in a trailing side of the trailing pad. The at least one notch-cut provides higher pressure at the recording head situated in the trailing pad and higher thermal flight control efficiency without a commensurate increase in touch-down power. As a result, the temperature around the recording head is lower than without the at least one notch-cut, thereby improving the lifetime of the recording head and data storage device.

18 Claims, 9 Drawing Sheets

(56) References Cited

U.S. PATENT DOCUMENTS

| | | | | |
|---|---|---|---|---|
| 7,511,922 B2* | 3/2009 | Musashi | | G11B 5/6082 |
| | | | | 360/235.7 |
| 7,525,766 B2* | 4/2009 | Tani | | G11B 5/6005 |
| | | | | 360/235.8 |
| 7,656,616 B2* | 2/2010 | Matsumoto | | G11B 5/60 |
| | | | | 360/236.5 |
| 7,679,863 B2* | 3/2010 | Hashimoto | | G11B 5/6005 |
| | | | | 360/235.8 |
| 7,787,216 B2* | 8/2010 | Hashimoto | | G11B 5/6082 |
| | | | | 360/236.3 |
| 7,936,538 B1* | 5/2011 | Zhang | | G11B 5/6064 |
| | | | | 360/236.1 |
| 7,961,432 B2* | 6/2011 | Hanyu | | G11B 5/6005 |
| | | | | 360/236.3 |
| 7,969,685 B2 | 6/2011 | Shen et al. | | |
| 8,116,037 B2* | 2/2012 | Kohira | | G11B 5/6005 |
| | | | | 360/236.2 |
| 8,427,784 B2* | 4/2013 | Sonoda | | G11B 5/6082 |
| | | | | 360/236.5 |
| 8,446,693 B2* | 5/2013 | Yao | | G11B 5/6005 |
| | | | | 360/236.4 |
| 8,593,763 B2* | 11/2013 | Scheppers | | G11B 5/6005 |
| | | | | 360/235.7 |
| 8,649,126 B2* | 2/2014 | Bolasna | | G11B 5/6005 |
| | | | | 360/236.5 |
| 8,681,455 B2 | 3/2014 | Reddy et al. | | |
| 8,867,172 B2 | 10/2014 | Zheng et al. | | |
| 9,691,422 B1 | 6/2017 | Hu | | |
| 10,984,828 B1 | 4/2021 | Huang et al. | | |
| 2002/0008939 A1* | 1/2002 | Boutaghou | | G11B 5/6005 |
| | | | | 360/236.1 |
| 2002/0071216 A1* | 6/2002 | Sannino | | G11B 5/6005 |
| | | | | 360/236.1 |
| 2002/0075599 A1* | 6/2002 | Rao | | G11B 5/6005 |
| | | | | 360/236.3 |
| 2002/0089790 A1* | 7/2002 | Stoebe | | G11B 5/6082 |
| | | | | 360/235.8 |
| 2002/0122275 A1* | 9/2002 | Stover | | G11B 5/6005 |
| | | | | 360/234.3 |
| 2002/0145828 A1* | 10/2002 | Mundt | | G11B 11/1058 |
| 2003/0058578 A1* | 3/2003 | Boutaghou | | G11B 5/6005 |
| | | | | 360/236.1 |
| 2003/0165031 A1* | 9/2003 | Rajakumar | | G11B 5/6082 |
| | | | | 360/236.1 |
| 2003/0184915 A1* | 10/2003 | Kameyama | | G11B 5/6005 |
| | | | | 360/235.8 |
| 2004/0090709 A1* | 5/2004 | Mundt | | G11B 5/6005 |
| 2005/0185342 A1 | 8/2005 | Tani | | |
| 2007/0058296 A1* | 3/2007 | Hashimoto | | G11B 5/6005 |
| | | | | 360/234.3 |
| 2008/0174916 A1 | 7/2008 | Song et al. | | |
| 2008/0276448 A1 | 11/2008 | Pentek | | |
| 2009/0262458 A1* | 10/2009 | Shen | | G11B 5/6064 |
| | | | | 360/234.3 |
| 2010/0039732 A1* | 2/2010 | Shen | | G11B 5/6005 |
| | | | | 360/235.4 |
| 2010/0232067 A1 | 9/2010 | Liners et al. | | |
| 2012/0229933 A1* | 9/2012 | Ma | | G11B 5/6082 |
| | | | | 360/234.1 |
| 2012/0275051 A1* | 11/2012 | Scheppers | | G11B 5/6005 |
| | | | | 360/99.15 |
| 2012/0275063 A1* | 11/2012 | Sonoda | | G11B 5/6082 |
| | | | | 360/236.5 |

OTHER PUBLICATIONS

Leonard Verano Gonzaga et al., "Slider Design Optimization for Lube-Surfing Head-Disk Interface Scheme," IEEE Transactions on Magnetics, vol. 46, No. 6, Jun. 2010.

International Search Report and Written Opinion from PCT Application No. PCT/US2022/030436 (filed May 22, 2022), dated Nov. 22, 2022.

* cited by examiner

SLIDER AIR BEARING DESIGNS WITH HIGHER PRESSURE AND HIGHER THERMAL FLYING HEIGHT (TFC) EFFICIENCY

BACKGROUND

Data storage devices, such as hard disk drives, are used to store large amounts of information. In magnetic storage systems, a magnetic head typically includes read and write transducers that allow magnetically encoded information on a magnetic recording medium, such as a disk, to be stored and retrieved.

The lifetime of the data storage device depends on the lifetime of the read/write transducers. The lifetime of the read/write transducers can be shortened due to high temperatures around them as the data storage device operates. Therefore, there is a need to reduce the temperature around the read/write transducers to extend the lifetime of the data storage device.

SUMMARY

This summary represents non-limiting embodiments of the disclosure.

In some aspects, the techniques described herein relate to a data storage device, including: a recording medium; and a slider including: a leading-edge surface, a trailing-edge surface parallel to the leading-edge surface, and a trailing pad situated closer to the trailing-edge surface than to the leading-edge surface, wherein the trailing pad includes at least one notch-cut in a trailing surface of the trailing pad.

In some aspects, the techniques described herein relate to a data storage device, wherein the at least one notch-cut includes a first notch-cut and a second notch-cut.

In some aspects, the techniques described herein relate to a data storage device, wherein the first notch-cut and the second notch-cut are approximate mirror images of each other.

In some aspects, the techniques described herein relate to a data storage device, wherein a shape or volume of the first notch-cut differs from a shape of the second notch-cut.

In some aspects, the techniques described herein relate to a data storage device, wherein a shape of at least one of the first notch-cut or the second notch-cut is irregular.

In some aspects, the techniques described herein relate to a data storage device, wherein the slider further includes a read/write transducer situated between the first notch-cut and the second notch-cut.

In some aspects, the techniques described herein relate to a data storage device, wherein a first depth of the first notch-cut is approximately equal to a second depth of the second notch-cut.

In some aspects, the techniques described herein relate to a data storage device, wherein the trailing pad further includes: an efficiency-flattening hole (EFH), and a read/write transducer situated between the EFH and the trailing surface of the trailing pad.

In some aspects, the techniques described herein relate to a data storage device, wherein a depth of the at least one notch-cut is between approximately 50 nm and approximately 2500 nm.

In some aspects, the techniques described herein relate to a data storage device, wherein an interior of the at least one notch-cut includes a plurality of levels.

In some aspects, the techniques described herein relate to a slider for a data storage device, the slider including: a leading-edge surface, a trailing-edge surface substantially parallel to the leading-edge surface, and an air-bearing surface (ABS), including: a trailing pad situated closer to the trailing-edge surface than to the leading-edge surface, wherein the trailing pad includes a plurality of notch-cuts in a trailing side of the trailing pad, wherein the plurality of notch-cuts includes a first notch-cut and a second notch-cut.

In some aspects, the techniques described herein relate to a slider, wherein, in an ABS view of the slider, a shape of the first notch-cut is an approximate mirror image of a shape of the second notch-cut.

In some aspects, the techniques described herein relate to a slider, wherein the shape of the first notch-cut is irregular.

In some aspects, the techniques described herein relate to a slider, wherein, in an ABS view of the slider, a shape of at least one of the first notch-cut or the second notch-cut is irregular.

In some aspects, the techniques described herein relate to a slider, wherein the shape of the at least one of the first notch-cut or the second notch-cut is a piecewise-linear shape.

In some aspects, the techniques described herein relate to a slider, further including: a read/write transducer situated between the first notch-cut and the second notch-cut.

In some aspects, the techniques described herein relate to a slider, wherein a first depth of the first notch-cut is approximately equal to a second depth of the second notch-cut.

In some aspects, the techniques described herein relate to a slider, wherein a maximum depth within the plurality of notch-cuts is between approximately 500 nm and approximately 2500 nm.

In some aspects, the techniques described herein relate to a slider, wherein an interior of at least one of the plurality of notch-cuts includes a plurality of levels.

In some aspects, the techniques described herein relate to a slider, wherein a first level of the plurality of levels is recessed from the ABS by between approximately 50 nm and approximately 250 nm, and a second level of the plurality of levels is recessed from the first level by more than 0 nm and up to approximately 2500 nm.

In some aspects, the techniques described herein relate to a method of making a slider, the method including: applying a mask to the slider, wherein the mask exposes a first region corresponding to the first notch-cut and a second region corresponding to the second notch-cut; and while the mask is in place, performing an ion milling step to create at least a portion of the first notch-cut and at least a portion of the second notch-cut.

BRIEF DESCRIPTION OF THE DRAWINGS

Objects, features, and advantages of the disclosure will be readily apparent from the following description of certain embodiments taken in conjunction with the accompanying drawings in which.

Figure 1:
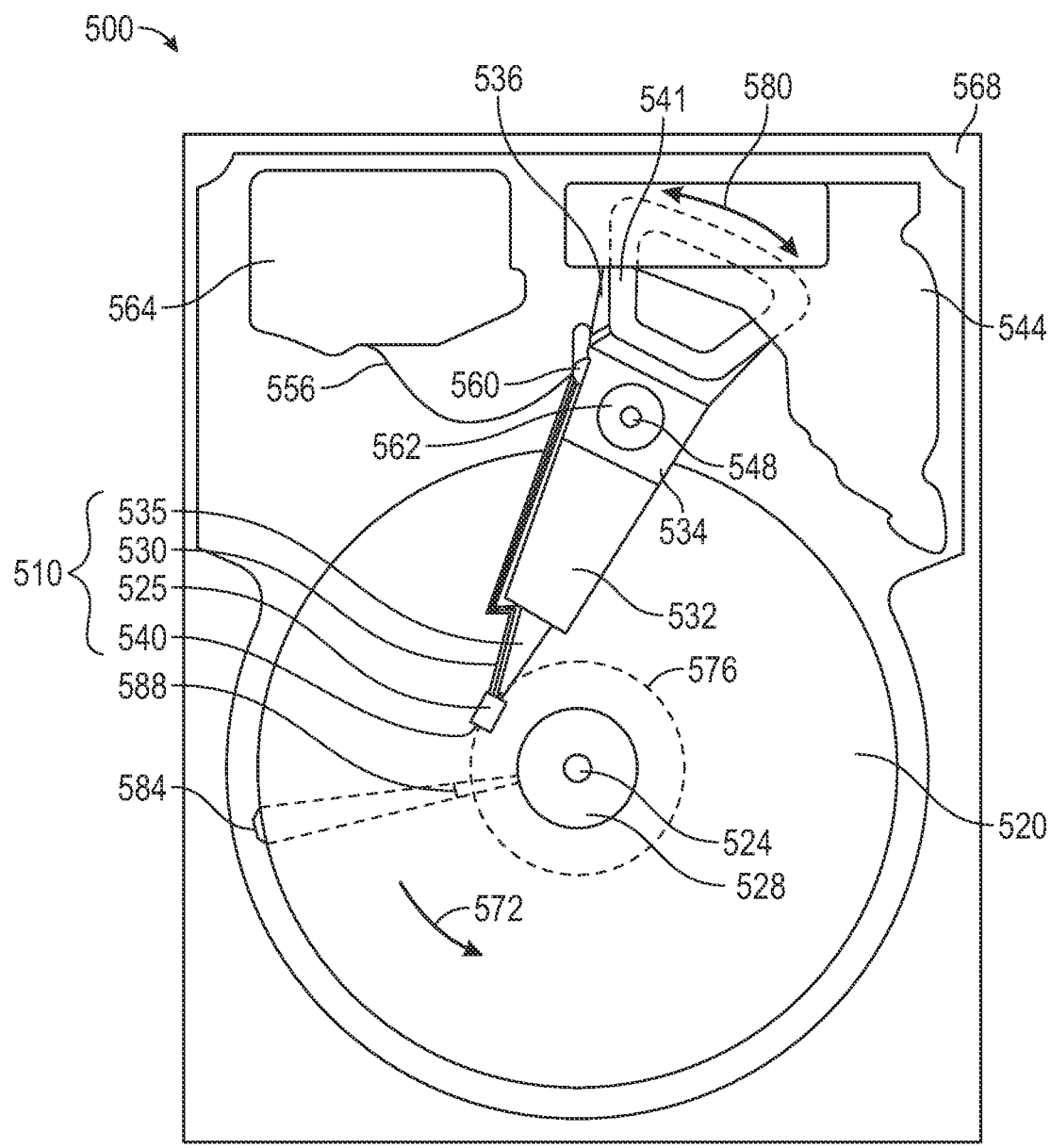
FIG. 1 is a plan view illustrating an example of a data storage device that may include one or more of the embodiments disclosed herein.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

The need to increase storage densities has led to the development of technologies such as microwave-assisted magnetic recording (MAMR) and heat-assisted magnetic recording (HAMR). In MAMR, elements added to the head generate an additional field that supplements the magnetic field ordinarily produced by the write transducer, thereby providing a stronger effective write field. In HAMR, elements added to the head heat a localized area on the surface of the recording media to reduce its coercivity, thereby enabling the magnetic field generated by the write transducer, which otherwise would be of insufficient strength, to set the magnetization of the localized area. Both of these techniques can result in the recording head operating at higher temperatures than recording heads in conventional hard drives.

Disclosed herein are slider air-bearing surface (ABS) designs that provide high thermal flying-height control (TFC) with relatively low touchdown (TD) power to reduce heating of the recording head. The disclosed ABS designs include a trailing pad that has at least one notch-cut in a trailing pad (which may also be referred to as a center pad) of the slider. In some embodiments, two notch-cuts are provided, with one on either side of the recording head. These new ABS designs can generate higher pressure than conventional ABS designs while maintaining lower TD power, thereby allowing the temperature around the recording head to be reduced, which can extend the lifetime of the head and the lifetime of the data storage device. The shapes and dimensions of the at least one notch-cut can be selected based on the design requirements and manufacturing capabilities and limitations.

It is to be appreciated that the disclosed techniques are not limited to devices using a particular recording technology (e.g., MAMR or HAMR). Rather, the disclosed techniques can be used in any type of data storage device that uses a slider. For example, the disclosed techniques may be used to improve the performance and/or lifetime of a conventional data storage device (e.g., a hard disk drive).

FIG. 1 is a plan view illustrating an example of a data storage device 500, illustrated as a hard disk drive, that may include one or more of the embodiments disclosed herein. FIG. 1 illustrates an example of the functional arrangement of components of the data storage device 500, including a slider 525 that includes a recording head 540. The recording head 540 (which may also be referred to herein as a transducer or a read/write transducer) includes a write element and a read element for respectively writing and reading information stored on a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In accordance with some embodiments, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a sealed, protective enclosure for the information storage components of the data storage device 500.

In accordance with some embodiments, other electronic components, including a disk controller and servo electronics such as a digital-signal processor (DSP), provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which enables the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

Figure 2:
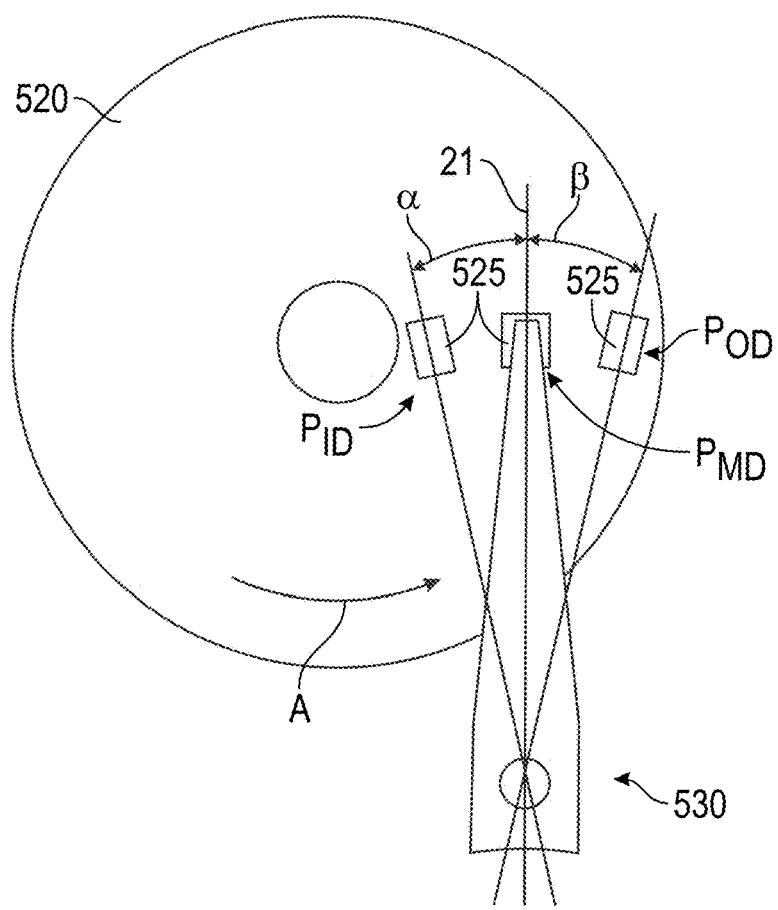
FIG. 2 is a diagram showing skew angles of a slider at different positions with respect to a recording medium in accordance with some embodiments.

FIG. 2 is a diagram showing skew angles of a slider 525 at different positions with respect to the recording medium 520. The suspension and actuator arm 530 supports the slider 525 above the surface of the recording medium 520 at locations including an inner diameter (ID) position $P_{ID}$, an outer diameter (OD) position $P_{OD}$, and positions between $P_{ID}$ and $P_{OD}$, including the mid-disk (MD) position $P_{MD}$. As the recording medium 520 spins, it produces airflow in a direction tangential to the recording medium 520 in the direction the recording medium 520 spins, as shown by the arrow A. When the slider 525 is at the mid-disk position $P_{MD}$, the centerline 21 of the slider 525 is approximately aligned with the direction of the airflow produced by the recording medium 520, and therefore the skew angle is 0 (zero). When the slider 525 is at other positions over the recording medium 520, however, the centerline 21 of the slider 525 is not aligned with the direction of the airflow produced by the recording medium 520. The angle of misalignment of the direction of the airflow and the centerline 21 of the slider 525 is known as the skew angle. The skew angle affects the aerodynamic characteristics of the slider ABS. Generally, the greater the skew angle, the lower the lift produced for a given airflow velocity. As shown in FIG. 2, when the slider 525 is at the ID position $P_{ID}$, the skew angle is α, which is the maximum skew angle in the ID direction. When the slider 525 is at the OD position $P_{OD}$, the skew angle is β, which is the maximum skew angle in the OD direction.

The airflow velocity produced by the spinning recording medium 520 is dependent on the distance between the slider 525 and the center of the recording medium 520. At slider 525 fly heights, the tangential airflow produced by the recording medium 520 is close to the tangential velocity of the recording medium 520. This tangential velocity is equal to (RPM)×2πR, where RPM is the number of rotations per minute of the recording medium 520, and R is the distance from the location of the slider 525 to the center of the recording medium 520. As a result of the skew angle's effect on lift and the variation in tangential airflow depending on the position of the slider 525 above the recording medium 520 surface, the slider 525 tends to fly at its highest level above the disk at the mid-disk position $P_{MD}$ and progressively lower toward the ID and OD to minimum fly-height levels at the ID position $P_{ID}$ and the OD position $P_{OD}$. This phenomenon is known as mid-disk (MD) hump.

Some modern data storage device 500 use a slider 525 equipped with a heater that heats the portion of the slider 525 on which the recording head 540 is mounted to reduce the distance between the recording head 540 and the recording medium 520 as the slider 525 flies over the recording medium 520. A thermal fly-height control (TFC) supplies the heater with electric current to generate heat that causes the portion of the slider 525 on which the recording head 540 is mounted to protrude by thermal expansion, which leads to decreased clearance between the recording medium 520 and the recording head 540.

Touchdown measurement enables estimation of the clearance between the recording head 540 and the recording medium 520 in data storage devices 500 that use TFC. The power required to cause the thermal protrusion to contact the recording medium 520 is the touchdown power (TDP). Once the TDP is determined, the power supplied by the TFC can be backed off from the TDP level to obtain a desired clearance between the recording head 540 and the recording medium 520. The TFC efficiency, which has units of distance/power (e.g., nm/mW), is a measure of the amount of power that must be applied by the TFC to cause a specified protrusion distance. The pull-back (PB) efficiency, which also has units of distance/power (e.g., nm/mW), is a measure of the amount by which the power supplied by the TFC must be backed off to achieve a desired spacing between the recording medium 520 and the recording head 540 protrusion. By measuring the TDP as the slider 525 flies over different portions of the recording medium 520 (i.e., at different distances from the center of the recording medium 520, such as ID, MD, and OD), a TDP profile may be generated to plot the TDP versus recording medium 520 radius. Similarly, by determining the TFC efficiency (or PB efficiency) at different slider 525 positions over the disk, a TFC efficiency profile (or PB efficiency profile) may be determined.

Figure 3:
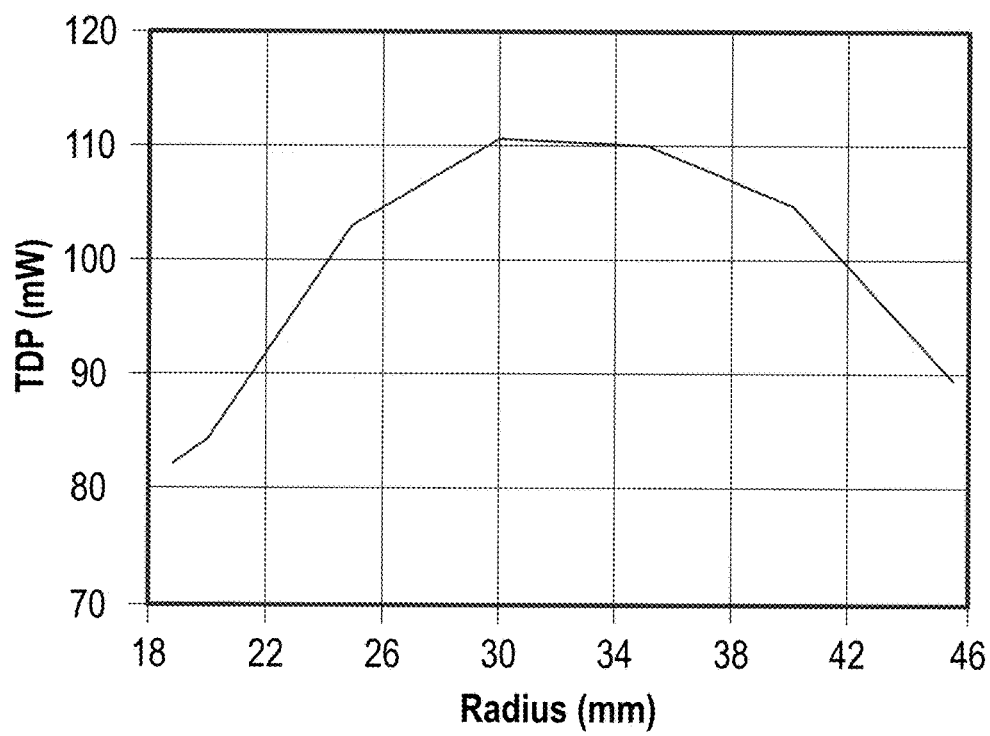
FIG. 3 illustrates an exemplary TDP profile for an example slider.

The MD hump is reflected in plots of the TDP profile as a TDP hump. FIG. 3 illustrates an exemplary TDP profile for an example slider 525. In the example plot of FIG. 3, the TDP peaks at around MD (at a power level over 110 mW approximately 30 mm from the disk center) and is lower at both ID (around 80 mW approximately 18 mm from the disk center) and OD (around 90 mW approximately 46 mm from the disk center). Thus, FIG. 3 illustrates that, relative to the amount of power required at ID and OD, more power is required near MD to cause the thermal protrusion to contact the disk, which confirms that the slider 525 flies further away from the disk at MD locations than at locations closer to ID or OD.

The use of TFC can improve the performance of data storage device 500 as described above, but repeated thermal expansion and contraction can shorten the lifetime of the recording head 540. One approach to improve the lifetime of the recording head 540 is to generate higher air pressure at the recording head 540 as the slider 525 flies with the goal being to reduce the temperature around it. Another approach is to reduce the TFC TD power to reduce heating of the recording head 540. There is tension between these two approaches, however. ABS designs that provide higher pressure at the recording head 540 generally also have higher TD power, which may offset the cooling effect of the higher pressure. Therefore, there is a need for alternative approaches that can reduce the temperature at the recording head 540 without a commensurate increase in TD power.

Disclosed herein are slider 525 embodiments with an ABS that includes at least one notch-cut in the trailing pad of the slider 525. The effect of the at least one notch-cut is to provide higher pressure at the recording head 540 and higher TFC efficiency without a commensurate increase in TD power. As a result, the temperature around the recording head 540 is lower than without the at least one notch-cut, thereby improving the lifetime of the recording head 540, and therefore the data storage device 500.

Figure 4A:
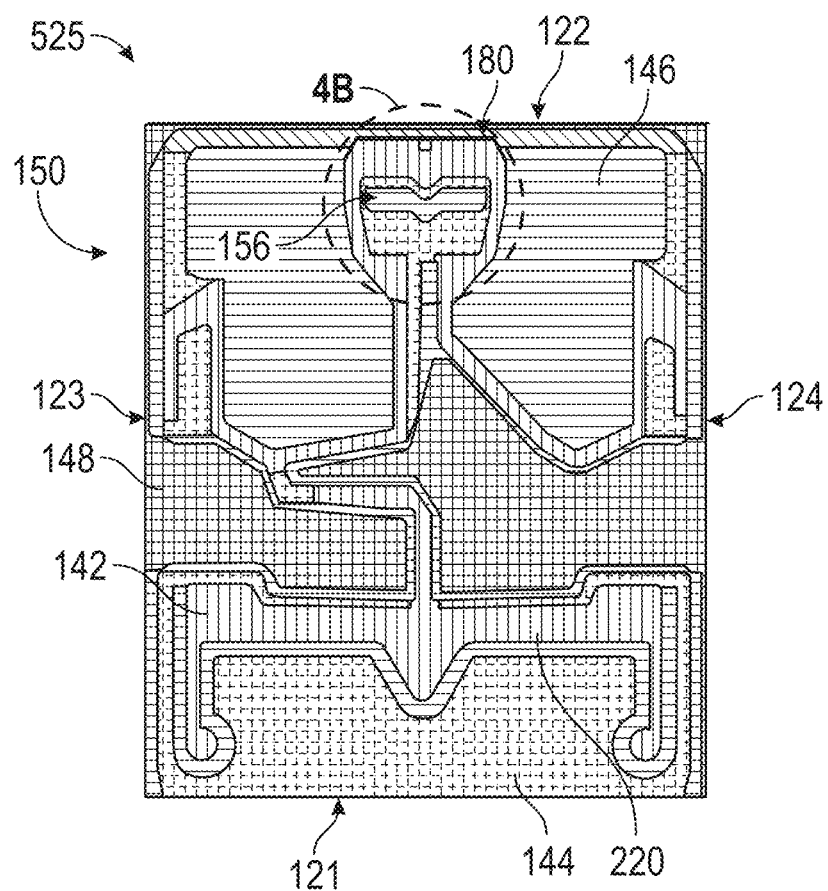
FIG. 4A is an ABS view of a slider without the notch-cuts disclosed herein.

FIG. 4A is an ABS view of a slider 525 without the notch-cuts disclosed herein. The slider 525 has a leading-edge surface 121, a trailing-edge surface 122 opposite and substantially parallel to the leading-edge surface 121, a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122. The first side-edge surface 123 and second side-edge surface 124 are substantially perpendicular to both the leading-edge surface 121 and the trailing-edge surface 122. The slider 525 includes a leading pad 220 near the leading-edge surface 121 and a trailing pad 180 near the trailing-edge surface 122 of the slider 525.

The ABS 150 of the slider 525 includes surfaces at several levels in x-y planes. The top of the leading pad 220 and top of the trailing pad 180 are at the level 142. The level 142 is at a level that, when the ABS 150 is facing upward, is the highest level of the ABS 150. When the slider 525 is installed in a data storage device 500, the level 142 is the level of the ABS 150 that is closest to the recording medium 520. (It is to be understood that when the recording medium 520 spins, certain surfaces at the level 142 (e.g., the top surface of the leading pad 220) may fly further from the recording medium 520 than other surfaces of the slider 525 at the same level 142 (e.g., the top surface of the trailing pad 180) due to the pitch angle of the slider 525 as it flies. Nevertheless, for purposes of the description herein, the level 142 is said to be closest to the recording medium 520 when the slider 525 is situated in a data storage device 500.)

The ABS 150 also includes various surfaces at a level 144. The level 144 is recessed from the level 142. The recess distance may be, for example, between about 100 nm and about 200 nm. For example, the distance by which the level 144 is recessed from the level 142 may be approximately 150 nm. In other words, the height difference between the level 142 and the level 144 may be about 150 nm.

The ABS 150 also includes various surfaces at a level 146. The level 146 is recessed from the level 142 and the level 144. The level 146 may be, for example, approximately 250 nm to 2500 nm below the level 142. When the slider 525 is installed in a data storage device 500, the level 146 is further from the recording medium 520 than are the level 142 and the level 144.

The ABS 150 also includes various surfaces at a level 148. The level 148 is recessed from the level 142, the level 144, and the level 146. The level 148 may be, for example, approximately 300 to 3000 nm (0.3-3 microns) below the level 142. When the slider 525 is installed in a data storage device 500, the level 148 is further from the recording medium 520 than are the level 142, the level 144, and the level 146.

Figure 4B:
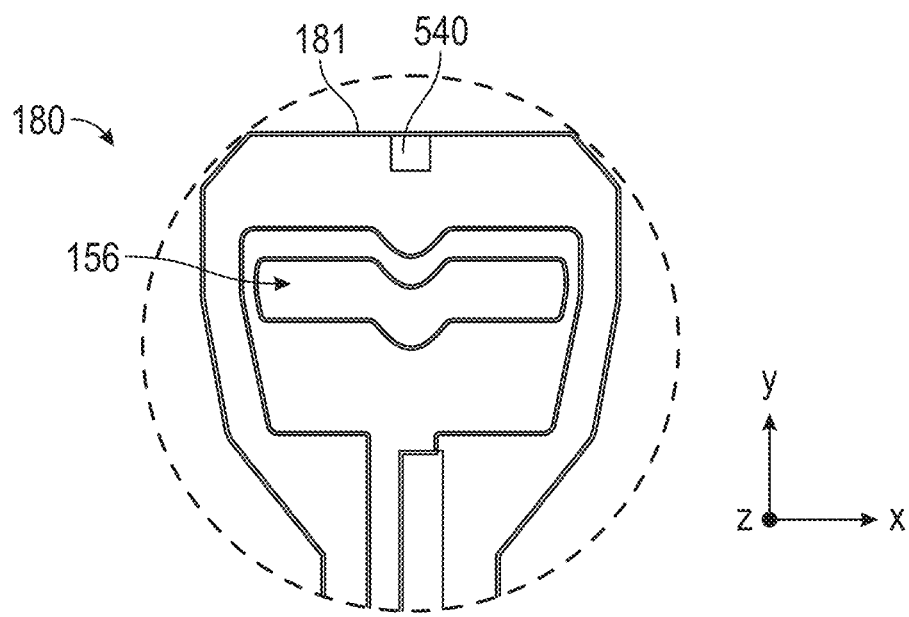
FIG. 4B is a closer view of the trailing pad shown in FIG. 4A.

FIG. 4B is a closer view of the trailing pad 180 shown in FIG. 4A. As illustrated, the trailing pad 180 has a recording head 540 mounted on it. The recording head 540 is situated near the trailing surface 181 of the trailing pad 180, which is close to the trailing-edge surface 122 of the slider 525.

The trailing pad 180 of the slider 525 also includes an efficiency-flattening hole (EFH) 156. As the slider 525 flies over the disk, the EFH 156 can store air and re-direct it onto the recording head 540 in a substantially uniform way that is largely independent of the location of the slider 525 over the recording medium 520 (i.e., the airflow is approximately consistent regardless of whether the slider flies at ID, MD, or OD). Efficiency-flattening holes are described in more detail in, for example, U.S. Pat. No. 9,691,422, which is hereby incorporated by reference in its entirety for all purposes.

Figure 4C:
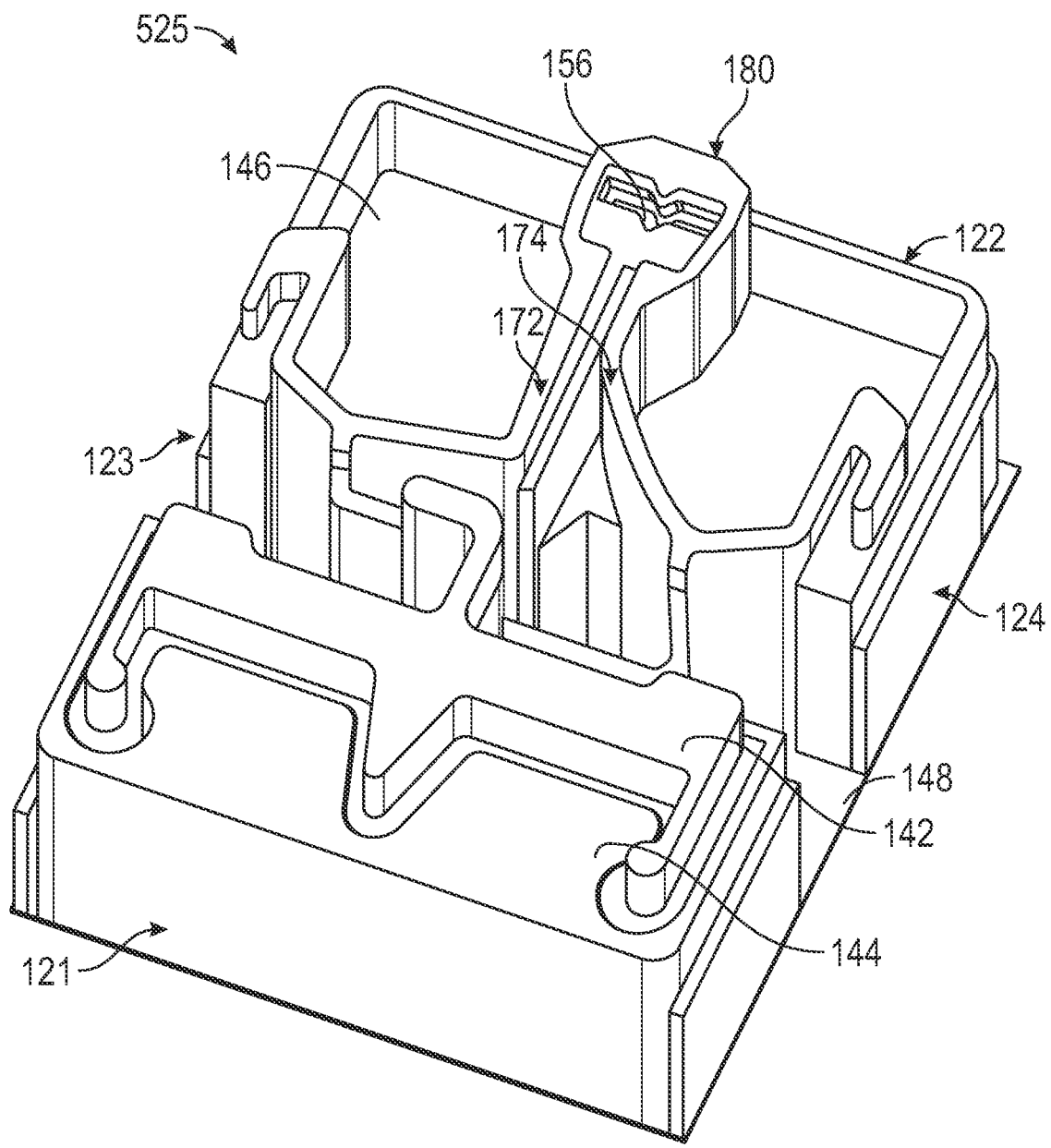
FIG. 4C is a perspective view of the slider shown in FIGS. 4A and 4B.

FIG. 4C is a perspective view of the slider 525 of FIGS. 4A and 4B with the ABS 150 oriented upward. As shown, in addition to the features already described, the slider 525 may also include first and second arms 172, 174 that connect to and extend from the trailing pad 180 toward the leading-edge surface 121. The first and second arms 172, 174 may be separated by an etched cavity and have tapered or stepped leading edges. In some embodiments, the first and second arms 172, 174 form a channel through which air flows when the slider 525 flies over the recording medium 520. Additional stepped surfaces may also be formed at various other locations on the slider 525, as illustrated in FIGS. 4A, 4B, and 4C.

It is to be understood that when the slider 525 is installed in a data storage device 500, the ABS 150 will be oriented downward, facing the recording medium 520. For ease of explanation, this document adopts the convention of illustrating and describing the slider 525 with the ABS 150 facing upward, as shown in FIG. 4C. With the slider 525 so oriented, the level 142 is illustrated and sometimes described as being "above" the levels 144, 146, and 148; the level 144 is illustrated and sometimes described as being "below" the level 142 and "above" the levels 146 and 148; the level 146 is illustrated and described as being "below" the levels 142 and 144 and "above" the level 148; and the level 148 is illustrated and described as being "below" the levels 142, 144, and 146. Of course, when the slider 525 is installed in a data storage device 500, the ABS 150 will be oriented downward, toward the recording medium 520. Consequently, the level 142 will be the level closest to the recording medium 520, making it the lowest level, and levels 144, 146, and 148 will be progressively further away from the recording medium 520.

Figure 5A:
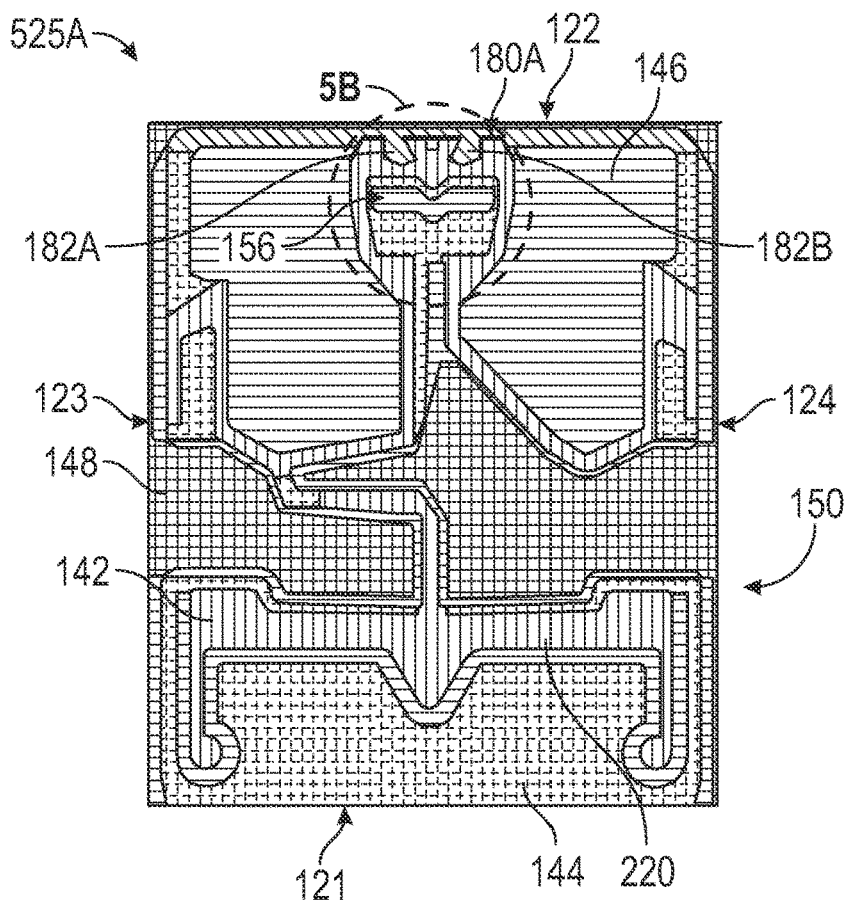
FIG. 5A is an ABS view of an example of a slider with notch-cuts in accordance with some embodiments.
Figure 5B:
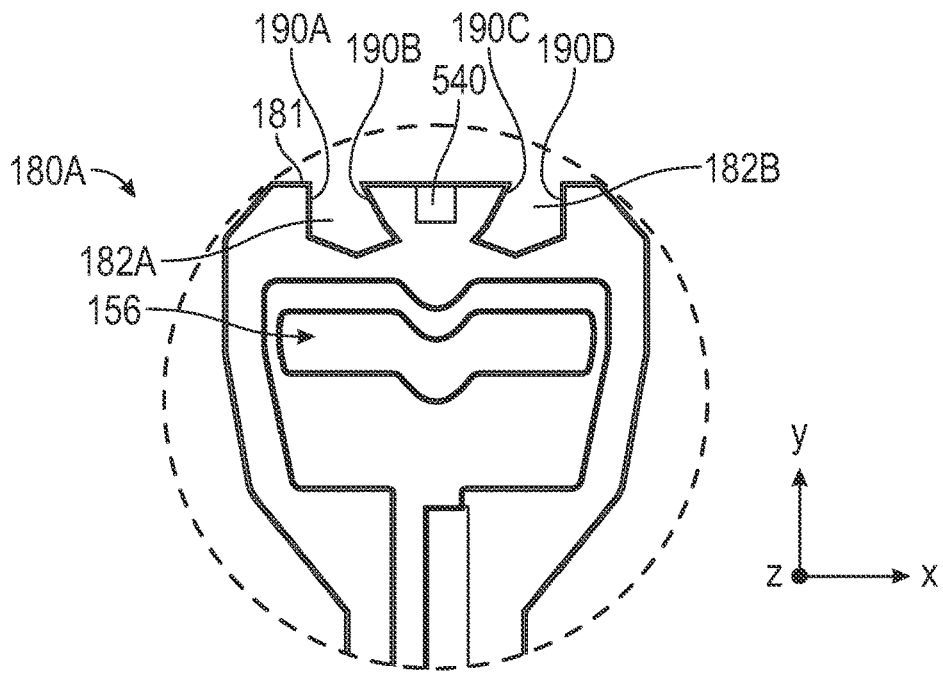
FIG. 5B is a closer view of the trailing pad shown in FIG. 5A.
Figure 5C:
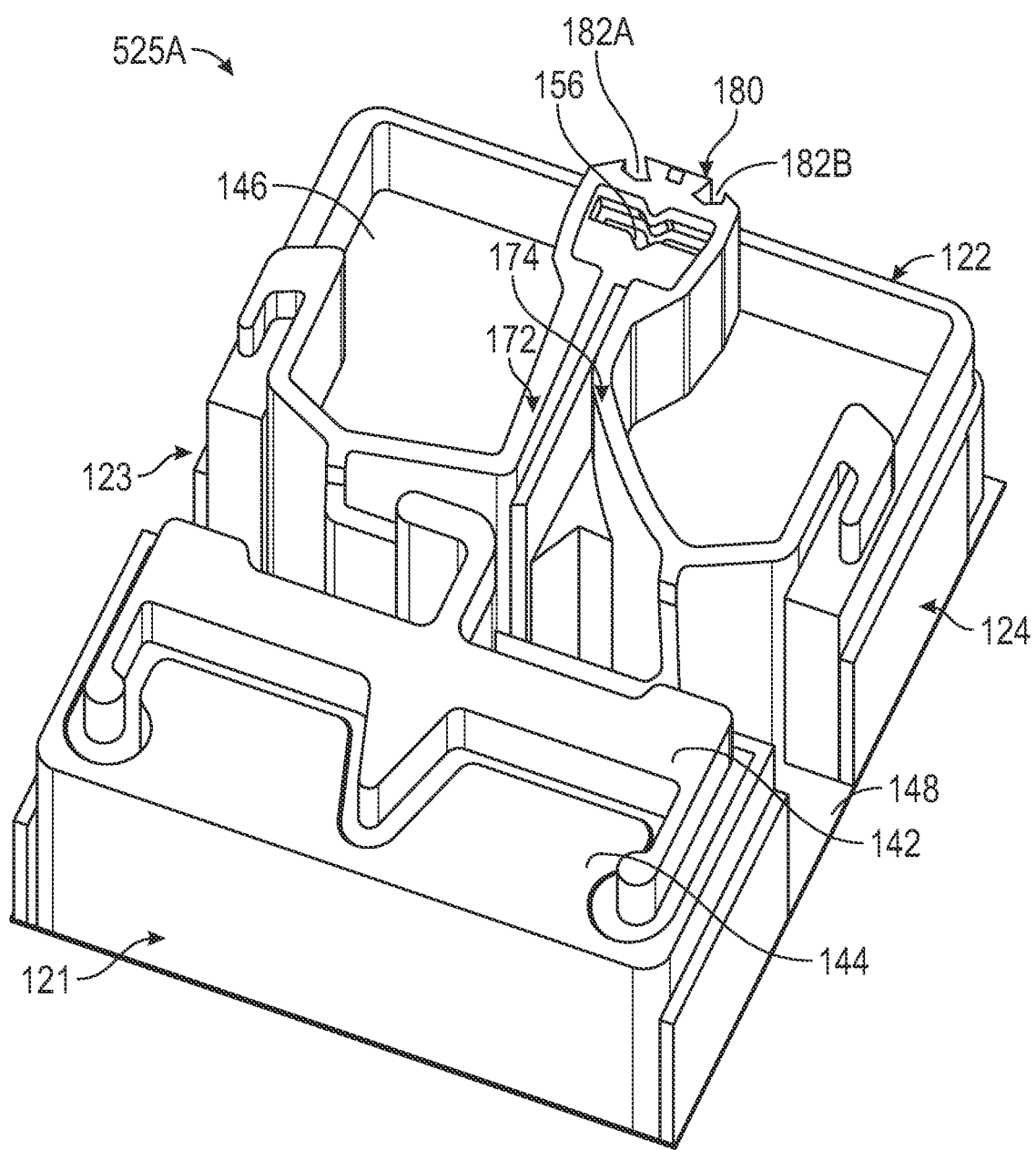
FIG. 5C is a perspective view of the slider shown in FIGS. 5A and 5B.

FIG. 5A is an ABS view of an example of a slider 525A in accordance with some embodiments. FIG. 5B is a closer view of the trailing pad 180A shown in FIG. 5A. FIG. 5C is a perspective view of the slider 525A of FIGS. 5A and 5B with the ABS 150 oriented upward. The slider 525A includes many of the same elements as the slider 525 described above in the context of FIGS. 4A, 4B, and 4C. Those elements have the same reference numerals in FIGS. 5A, 5B, and 5C, and the descriptions of those elements provided in the context of FIGS. 4A, 4B, and 4C apply to FIGS. 5A, 5B, and 5C and are not repeated.

The slider 525A also includes a trailing pad 180A. Like the trailing pad 180 of FIGS. 4A, 4B, and 4C, the trailing pad 180A has an EFH 156, and it also has a recording head 540 situated near the trailing surface 181 of the trailing pad 180A, which is close to the trailing-edge surface 122 of the slider 525A. The recording head 540 is situated between the EFH 156 and the trailing surface 181.

As shown in FIGS. 5A, 5B, and 5C, the trailing pad 180A also includes at least one notch-cut in the trailing surface 181 of the trailing pad 180A. Specifically, the example slider 525A includes the notch-cut 182A and the notch-cut 182B, which are situated to the sides of the recording head 540. In other words, the recording head 540 is situated between the notch-cut 182A and the notch-cut 182B. Each of the notch-cut 182A and the notch-cut 182B has an interior that is bounded by a respective plurality of surfaces. For example, in some embodiments, each of the notch-cut 182A and the notch-cut 182B includes a respective floor, which is described in further detail below in the discussion of FIGS. 7A, 7B, and 7C. FIG. 5B labels examples of additional surfaces that bound the interiors of the notch-cut 182A and the notch-cut 182B. For example, FIG. 5B labels the surface 190A and the surface 190B, both of which bound the interior of the notch-cut 182A. FIG. 5B also labels the surface 190C and the surface 190D, which are two of the plurality of surfaces that bound the interior of the notch-cut 182B. It is to be appreciated that, as illustrated in FIG. 5B, the interior of each of the notch-cut 182A and the notch-cut 182B can be bounded by more than three surfaces.

As explained further below, the notch-cuts 182 and the notch-cut 182B may be created in the trailing pad 180A during the slider 525A manufacturing process by etching (e.g., using ion milling). The notch-cut 182A and the notch-cut 182B may have any suitable size, shape, and volume. For example, the notch-cut 182A and the notch-cut 182B may be approximate mirror images of each other (e.g., about an axis in the y-direction using the axes shown in FIG. 5B). As another example, the notch-cut 182A and notch-cut 182B may differ from each other in one or more respects. For example, their sizes, shapes, or volumes may be different. The shapes of the notch-cut 182A and/or notch-cut 182B may be regular or irregular. As will be appreciated by those having ordinary skill in the art, a shape is regular if at least some of its sides and/or interior angles have some relationship to each other (e.g., a rectangle is a regular shape because it has at least two sides of substantially equal lengths, and all of its interior angles are 90 degrees). A shape is irregular if its sides and interior angles are in no particular relation to each other. In other words, an irregular shape has sides and interior angles of any length and size. As shown in FIG. 5B, the shape of the notch-cut 182A and/or the notch-cut 182B may be partially or fully piecewise-linear in the ABS view of the slider 525A.

Figure 6A:
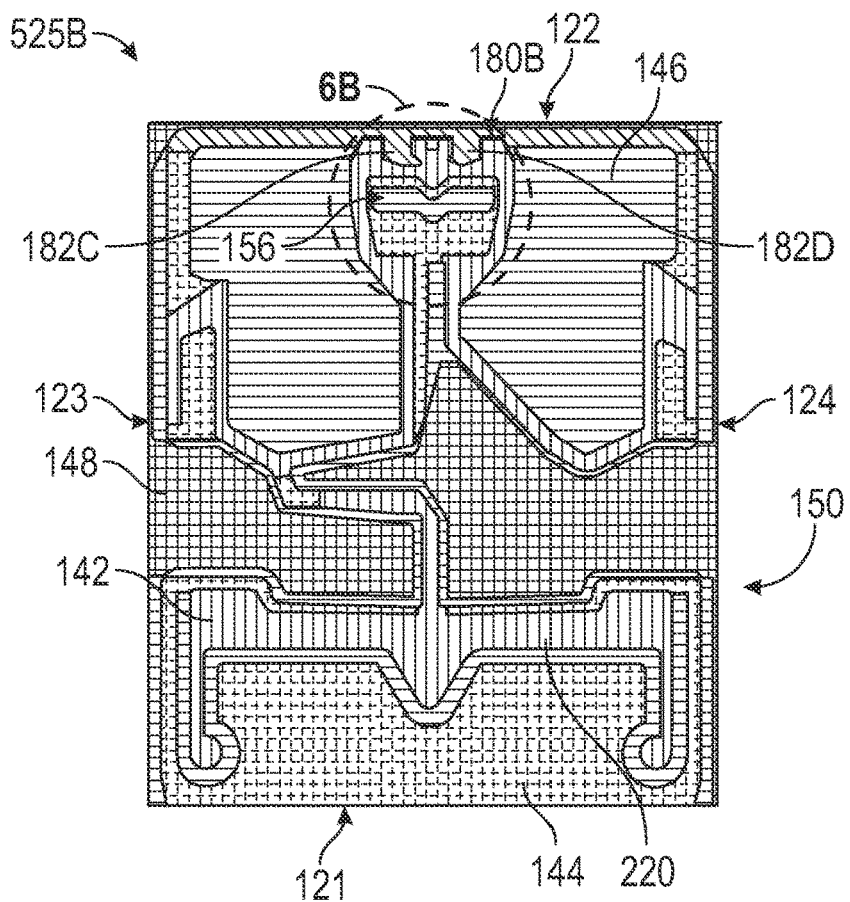
FIG. 6A is an ABS view of an example of another slider with notch-cuts in accordance with some embodiments.
Figure 6B:
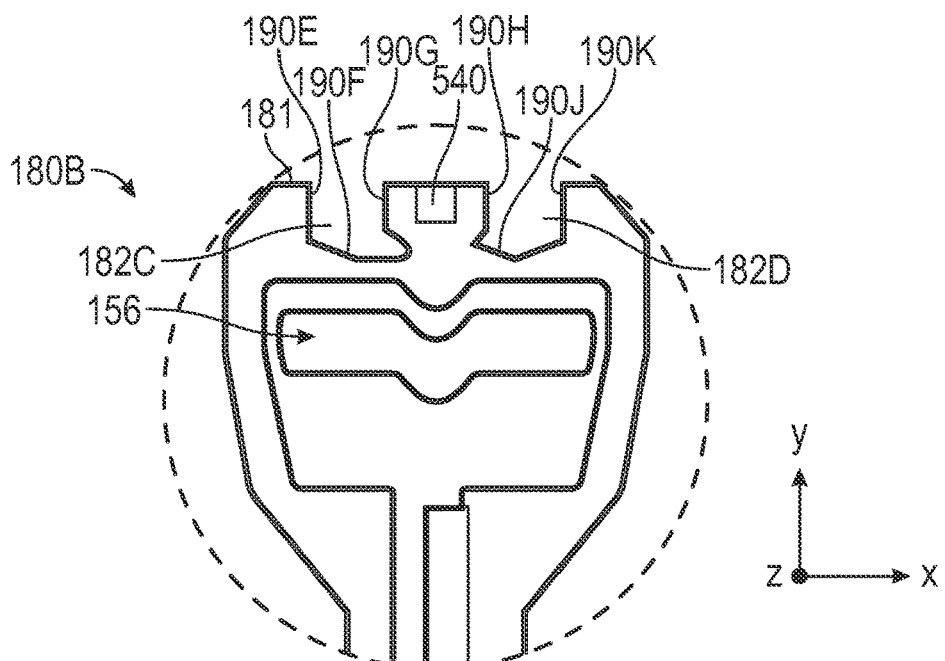
FIG. 6B is a closer view of the trailing pad shown in FIG. 6A.

FIG. 6A is an ABS view of an example of another slider 525B in accordance with some embodiments. FIG. 6B is a closer view of the trailing pad 180B shown in FIG. 6A. The slider 525B includes many of the same elements as the slider 525 described above in the context of FIGS. 4A, 4B, and 4C. Those elements have the same reference numerals in FIGS. 6A and 6B and the descriptions of those elements provided in the context of FIGS. 4A, 4B, and 4C apply to FIGS. 6A and 6B and are not repeated.

The slider 525B also includes a trailing pad 180B. Like the trailing pad 180 of FIGS. 4A, 4B, and 4C and the trailing pad 180A of FIG. 5A, the trailing pad 180B has an EFH 156, and it also has a recording head 540 situated near the trailing surface 181 of the trailing pad 180B, which is close to the trailing-edge surface 122 of the slider 525B. The recording head 540 is situated between the EFH 156 and the trailing surface 181.

As shown in FIGS. 6A and 6B, the trailing pad 180B also includes at least one notch-cut in the trailing surface 181 of the trailing pad 180B. Specifically, the example slider 525B includes the notch-cut 182C and the notch-cut 182D, which are situated to the sides of the recording head 540. In other words, the recording head 540 is situated between the notch-cut 182C and the notch-cut 182D. Each of the notch-cut 182C and the notch-cut 182D has an interior that is bounded by a respective plurality of surfaces. For example, in some embodiments, each of the notch-cut 182C and the notch-cut 182D includes a respective floor, which is described in further detail below in the discussion of FIGS. 7A, 7B, and 7C. FIG. 6B labels examples of additional surfaces that bound the interiors of the notch-cut 182C and the notch-cut 182D. For example, FIG. 6B labels the surface 190E, the surface 190F, and the surface 190G, all of which bound the interior of the notch-cut 182C. FIG. 6B also labels the surface 190H, the surface 190J, and the surface 190K, which are three of the plurality of surfaces that bound the interior of the notch-cut 182D. It is to be appreciated that, as illustrated in FIG. 6B, the interior of each of the notch-cut 182C and the notch-cut 182D can be bounded by more than three surfaces.

As explained above in the discussion of the notch-cut 182A and the notch-cut 182B, the notch-cut 182C and the notch-cut 182D may have any suitable size, shape, and volume. For example, the notch-cut 182C and the notch-cut 182D may be approximate mirror images of each other as described above and illustrated in FIGS. 5A, 5B, and 5C. As another example, and as illustrated in FIGS. 6A and 6B the notch-cut 182C and notch-cut 182D may differ from each other in one or more respects. For example, their sizes, shapes, or volumes may be different. The notch-cut 182C and the notch-cut 182D need not be mirror images of each other, as shown in FIGS. 6A and 6B. The shapes of the notch-cut 182C and/or notch-cut 182D may be regular or irregular. As shown in FIG. 6B, the shape of the notch-cut 182C and/or the notch-cut 182D may be partially or fully piecewise-linear in the ABS view of the slider 525A.

Figure 7A:
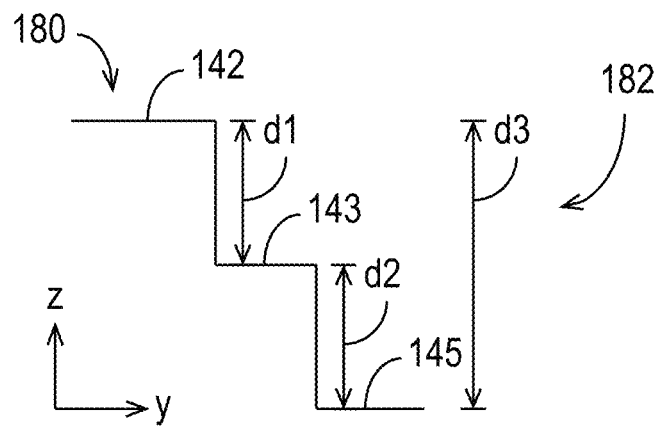
FIGS. 7A, 7B, and 7C are cross-section views of the interiors of example notch-cuts in accordance with some embodiments.
Figure 7B:
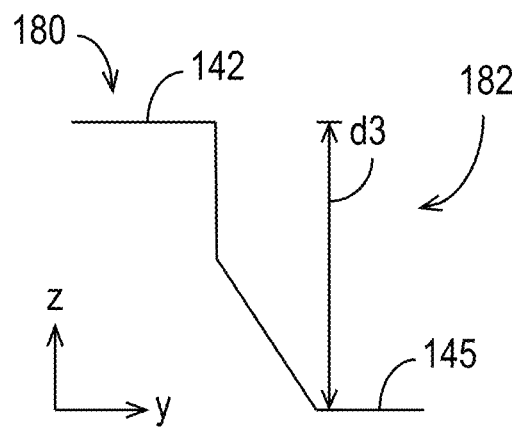
Figure 7C:
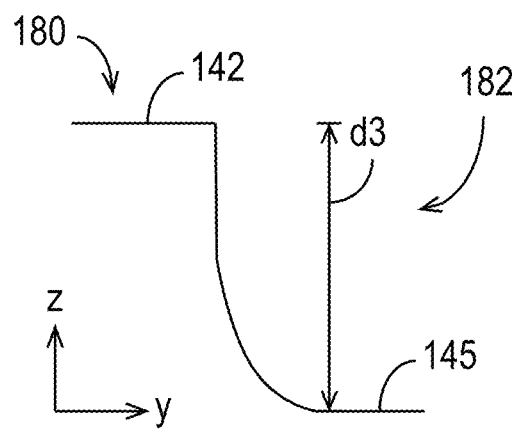

FIGS. 7A, 7B, and 7C are cross-section views in a y-z plane of the interiors of example notch-cuts 182 in accordance with some embodiments. The notch-cuts 182 may be, for example, any of the notch-cut 182A, notch-cut 182B, the notch-cut 182C, or notch-cut 182D illustrated in FIGS. 5A, 5B, 5C, 6A, and 6B and described above.

The interior of a notch-cut 182 may have any suitable shape and characteristics. For example, as shown in FIG. 7A, the interior of a notch-cut 182 may have multiple levels. In the example of FIG. 7A, a first level 143 is recessed by a distance d1 from the level 142 of the trailing pad 180 (e.g., trailing pad 180A or trailing pad 180B). In the example of FIG. 7A, the second level 145 is recessed from the first level 143 by a distance d2. The first level 143 may be, for example, at the same level as the level 144. The distance d1 may be, for example, between approximately 50 nm and approximately 250 nm. The second level 145 may be, for example, at the same level as the level 146 or the level 148. The distance d2 may be, for example, greater than 0 nm and up to approximately 2500 nm.

Another example of the interior of a notch-cut 182 is illustrated in FIG. 7B. As shown some or all of the interior of a notch-cut 182 may be sloped in the y-z plane.

FIG. 7C shows yet another example interior of a notch-cut 182 in which at least a portion of the interior surface is sloped.

The maximum depth of each of the notch-cuts 182 shown in FIGS. 7A, 7B, and 7C is a distance d3 from the level 142. The maximum depth may be, for example, the same as the recess distance (relative to the level 142) of the level 144, the level 146, or the level 148. The maximum depth may be, for example, between approximately 250 nm and approximately 3000 nm. In embodiments that include a plurality of notch-cuts 182, the depths of two or more notch-cuts 182 may be the same, or each notch-cut 182 may have a different maximum depth.

It is to be appreciated that FIGS. 7A, 7B, and 7C show example interiors of notch-cuts 182, but they are by no means exhaustive. A wide variety of interior profiles, shapes, and characteristics can be created based on the disclosures herein. The specific examples provided are not intended to be limiting.

The effect of the notch-cuts 182 disclosed herein is illustrated in the table below, which compares the maximum ABS pressure and TD power for a conventional slider (e.g., similar to the slider 525 shown in FIGS. 4A and 4B) and a slider with notch-cuts 182 (e.g., as illustrated in FIGS. 5A, 5B, 5C, 6A, 6B, 7A, 7B, 7C). As the table entries indicate, the slider with notch-cuts 182 provides higher pressure while maintaining lower TD power than the slider without notch-cuts 182.

| Slider type | ABS maximum pressure (atm) | TD power (mW) |
| --- | --- | --- |
| Conventional | 94 | 110 |
| With notch-cuts 182 | 113 | 102 |

Sliders 525 with notch-cuts 182 as disclosed herein can be fabricated from a wafer using a photolithography process having two fundamental steps: (a) covering a portion of a surface of the wafer (e.g., using a photoresist mask), and (b) removing substrate material from the exposed (e.g., not covered by the mask) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the recording medium 520 when the slider 525 is used in a data storage device 500, i.e., the ABS 150.

The steps (a) and (b) may be repeated multiple times to create different features of the slider 525. The following discussion focuses on the ABS 150 features near the leading-edge surface 121, but it will be appreciated that the other features of the ABS 150 can also be fabricated during the described steps or during other steps of the slider 525 manufacturing process that are known in the art.

Figure 8:
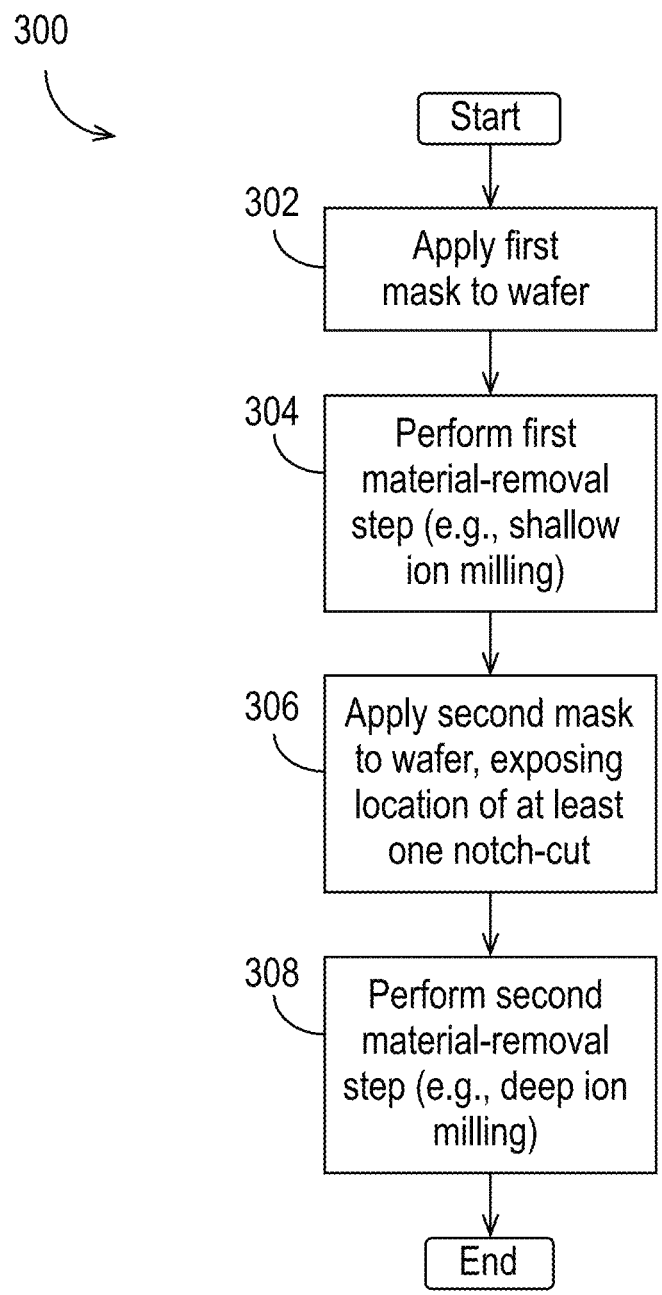
FIG. 8 is a flow diagram illustrating a portion of a method of fabricating a slider with at least one notch-cut in accordance with some embodiments.

FIG. 8 is a flow diagram illustrating a portion of a method 300 of fabricating a slider 525 with at least one notch-cut 182 in accordance with some embodiments. The method 300 can be used to fabricate the notch-cut 182A, notch-cut 182B, notch-cut 182C, and/or notch-cut 182D. The slider 525 fabrication process can include additional steps that are known in the art but that are not shown in FIG. 8. These additional steps may be performed before, between, and/or after the steps illustrated in FIG. 8. Although the description of the method 300 focuses only the steps of the method 300 related to creating the notch-cuts 182, it will be appreciated that other features of the slider 525 can also be created during these steps.

At block 302, a first mask is applied to the wafer. The first mask includes a region that defines the level 142 of trailing pad 180, as well as the level 142 of other features of the slider 525 ABS 150. At block 304, a first material-removal step is performed to remove material from the wafer. The first material-removal step may use, for example, shallow ion milling. At least part of the leading pad 220 and the trailing pad 180 may be apparent in the slider 525 after block 304 is complete.

After completion of block 304, and potentially additional intervening manufacturing steps, at block 306, a second mask is applied to the wafer. The second mask exposes the location of at least one notch-cut 182. At block 308, a second material-removal step is performed to remove additional material from the wafer, including material from the interior(s) of the at least one notch-cut 182. After block 308, the slider 525 includes at least one notch-cut 182 in the trailing pad 180. The at least one notch-cut 182 may be complete after block 308, or its shape, size, interior, etc. may be further refined in later manufacturing steps (e.g., if, after the block 308, the at least one notch-cuts 182 has a maximum depth d3 at the first level 143, a second level 145 may be created in a later step).

After completion of block 308, and potentially additional intervening manufacturing steps, additional masks can be applied and additional material removed from the interiors of the notch-cuts 182. For example, another mask can be applied to cover the first level 143 and to allow a second level 145 to be created within the interior of a notch-cut 182. Likewise, different masks can be applied and material removed to create notch-cuts 182 having different depths, sizes, volumes, shapes, etc. It will be appreciated by those having ordinary skill in the art that a wide variety of notch-cuts 182 can be created using the steps (a) and (b) described above. The examples provided herein are not intended to be limiting.

Furthermore, although the disclosures herein may be useful in data storage devices 500 that use TFC (e.g., MAMR devices), it is to be understood that the techniques described are not limited to any particular recording technology. For example, the disclosed techniques may be applied to other types of data storage device 500 (e.g., perpendicular magnetic recording (PMR), HAMR, etc.).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The terms "substantially" and "approximately" are used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" or "approximately equal" means that the two lengths are the same for all practical purposes, but they may not (and need not) be precisely equal at sufficiently small scales. As another example, a structure that is "substantially vertical" or "approximately vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A data storage device, comprising:
   a recording medium; and
   a slider comprising:
      a leading-edge surface,
      a trailing-edge surface parallel to the leading-edge surface, and
      a trailing pad situated closer to the trailing-edge surface than to the leading-edge surface, wherein the trailing pad comprises a first notch-cut and a second notch-cut in a trailing surface of the trailing pad,
      wherein the first notch-cut has a first interior bounded by a first plurality of at least three surfaces and the second notch-cut has a second interior bounded by a second plurality of at least three surfaces,
      wherein the first interior is exposed only to an air-bearing surface (ABS) of the slider and along the trailing surface of the trailing pad and wherein the second interior is exposed only to the ABS of the slider and along the trailing surface of the trailing pad,
      wherein the first interior and the second interior are non-intersecting, and
      wherein at least one of the first interior or the second interior includes a plurality of levels.

2. The data storage device recited in claim 1, wherein the first notch-cut and the second notch-cut are approximate mirror images of each other.

3. The data storage device recited in claim 1, wherein a shape or volume of the first interior of the first notch-cut differs from a shape or volume of the second interior of the second notch-cut.

4. The data storage device recited in claim 1, wherein, in an ABS view of the slider, a shape of at least one of the first notch-cut or the second notch-cut is irregular.

5. The data storage device recited in claim 1, wherein the slider further comprises a read/write transducer situated between the first notch-cut and the second notch-cut.

6. The data storage device recited in claim 1, wherein a maximum depth of the first notch-cut is approximately equal to a maximum depth of the second notch-cut.

7. The data storage device recited in claim 1, wherein the trailing pad further comprises:
   an efficiency-flattening hole (EFH), and
   a read/write transducer situated between the EFH and the trailing surface of the trailing pad.

8. The data storage device recited in claim 1, wherein a maximum depth of the first notch-cut is between approximately 50 nm and approximately 2500 nm.

9. A slider for a data storage device, the slider comprising:
   a leading-edge surface,
   a trailing-edge surface substantially parallel to the leading-edge surface, and
   an air-bearing surface (ABS), comprising:
      a trailing pad situated closer to the trailing-edge surface than to the leading-edge surface, wherein the trailing pad comprises a plurality of notch-cuts in a trailing side of the trailing pad, wherein the plurality of notch-cuts includes a first notch-cut and a second notch-cut, wherein:
         the first notch-cut has a first interior bounded by a first plurality of at least three surfaces, and wherein the first interior is exposed only to the ABS and along the trailing side of the trailing pad,
         the second notch-cut has a second interior bounded by a second plurality of at least three surfaces, and wherein the second interior is exposed only to the ABS and along the trailing side of the trailing pad,
         the first interior and the second interior are non-intersecting, and
         at least one of the first interior or the second interior includes a plurality of levels.

10. The slider recited in claim 9, wherein, in an ABS view of the slider, a shape of the first notch-cut is an approximate mirror image of a shape of the second notch-cut.

11. The slider recited in claim 10, wherein the shape of the first notch-cut is irregular.

12. The slider recited in claim 9, wherein, in an ABS view of the slider, a shape of at least one of the first notch-cut or the second notch-cut is irregular.

13. The slider recited in claim 12, wherein the shape of the at least one of the first notch-cut or the second notch-cut is a piecewise-linear shape.

14. The slider recited in claim 9, further comprising:
   a read/write transducer situated between the first notch-cut and the second notch-cut.

15. The slider recited in claim 9, wherein a maximum depth of the first notch-cut is approximately equal to a maximum depth of the second notch-cut.

16. The slider recited in claim 9, wherein a maximum depth within the plurality of notch-cuts is between approximately 500 nm and approximately 2500 nm.

17. The slider recited in claim 9, wherein a first level of the plurality of levels is recessed from the ABS by between approximately 50 nm and approximately 250 nm, and a second level of the plurality of levels is recessed from the first level by more than 0 nm and up to approximately 2500 nm.

18. A method of making a slider comprising a leading-edge surface, a trailing-edge surface substantially parallel to the leading-edge surface, and an air-bearing surface (ABS), wherein the ABS comprises a trailing pad situated closer to the trailing-edge surface than to the leading-edge surface, wherein the trailing pad comprises a plurality of notch-cuts in a trailing side of the trailing pad, wherein the plurality of notch-cuts includes a first notch-cut and a second notch-cut, wherein the first notch-cut has a first interior bounded by a first plurality of at least three surfaces, wherein the first interior is exposed only to the ABS and along the trailing side of the trailing pad, and wherein the second notch-cut has a second interior bounded by a second plurality of at least three surfaces, wherein the second interior is exposed only to the ABS and along the trailing side of the trailing pad, wherein the first interior and the second interior are non-intersecting, and wherein at least one of the first interior or the second interior includes a plurality of levels, the method comprising:
   applying a mask to the slider, wherein the mask exposes a first region corresponding to the first notch-cut and a second region corresponding to the second notch-cut; and
   while the mask is in place, performing an ion milling step to create at least a portion of the first notch-cut and at least a portion of the second notch-cut.

* * * * *